US012553512B2

United States Patent
(12) United States Patent
Yamashita et al.

(10) Patent No.: US 12,553,512 B2
(45) Date of Patent: Feb. 17, 2026

(54) POWER TRANSMISSION DEVICE

(71) Applicants: JATCO LTD, Fuij (JP); Nissan Motor Co., Ltd., Yokohama (JP)

(72) Inventors: Katsunori Yamashita, Kanagawa (JP); Hirohisa Yukawa, Tokyo (JP); Kazuya Numata, Kanagawa (JP)

(73) Assignees: JATCO LTD, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/846,950

(22) PCT Filed: Mar. 23, 2023

(86) PCT No.: PCT/JP2023/011609
§ 371 (c)(1),
(2) Date: Sep. 13, 2024

(87) PCT Pub. No.: WO2023/182446
PCT Pub. Date: Sep. 28, 2023

(65) Prior Publication Data

US 2025/0224029 A1 Jul. 10, 2025

(30) Foreign Application Priority Data

Mar. 23, 2022 (JP) ................................ 2022-047605

(51) Int. Cl.
*F16H 57/04* (2010.01)
*F16H 57/02* (2012.01)
(Continued)

(52) U.S. Cl.
CPC ....... *F16H 57/0415* (2013.01); *F16H 57/031* (2013.01); *F16H 57/0435* (2013.01);
(Continued)

(58) Field of Classification Search
CPC .... F16H 57/031; F16H 57/035; F16H 57/037; F16H 57/0415; F16H 57/0435; F16H 57/0441
See application file for complete search history.

(56) References Cited

U.S. PATENT DOCUMENTS 8,069,951 B2 12/2011 Sugano et al.
10,295,048 B2 5/2019 Moriyama et al.
(Continued)

FOREIGN PATENT DOCUMENTS

JP H04-058652 U 5/1992
JP 2006-105187 A 4/2006
(Continued)

*Primary Examiner* — Adam D Rogers
(74) *Attorney, Agent, or Firm* — Spencer Fane LLP

(57) ABSTRACT

A power transmission device for a vehicle includes a housing that accommodates a power transmission mechanism, a control valve, a heat exchanger, a first chamber that accommodates the power transmission mechanism, and a second chamber in which the control valve is arranged upright. The housing includes a case, a first cover joined to the case forming the first chamber with the case, and a second cover joined to the case from a front of the vehicle forming the second chamber with the case. The heat exchanger is attached to a vehicle front side of the first cover. As viewed from the direction of the axis of rotation of the power transmission mechanism, at least a part of the heat exchanger is provided in a positional relationship overlapping the control valve.

15 Claims, 8 Drawing Sheets

(51) Int. Cl.
*F16H 57/031* (2012.01)
*F16H 57/035* (2012.01)
*F16H 57/037* (2012.01)

(52) U.S. Cl.
CPC ....... *F16H 57/0441* (2013.01); *F16H 57/035* (2013.01); *F16H 57/037* (2013.01)

(56) References Cited

U.S. PATENT DOCUMENTS

| | | | | |
|---|---|---|---|---|
| 11,434,977 | B2 * | 9/2022 | Takahashi | F16H 57/04 |
| 11,859,714 | B2 * | 1/2024 | Yukawa | F16H 61/0006 |
| 12,416,355 | B2 * | 9/2025 | Yamashita | F16H 57/0446 |
| 2006/0070811 | A1 | 4/2006 | Sugano et al. | |
| 2017/0219083 | A1 | 8/2017 | Ito et al. | |
| 2017/0268657 | A1 | 9/2017 | Moriyama et al. | |
| 2025/0067333 | A1 * | 2/2025 | Tsuchida | F16H 57/0436 |
| 2025/0198500 | A1 * | 6/2025 | Yamashita | F16H 57/031 |
| 2025/0198503 | A1 * | 6/2025 | Tsuchida | F16H 57/045 |
| 2025/0207660 | A1 * | 6/2025 | Yamashita | F16H 57/0423 |
| 2025/0207661 | A1 * | 6/2025 | Yamashita | F16H 57/0424 |
| 2025/0215968 | A1 * | 7/2025 | Yamashita | F16H 57/0404 |

FOREIGN PATENT DOCUMENTS

| | | | | |
|---|---|---|---|---|
| JP | 2012-026462 | A | 2/2012 | |
| JP | 2016-044712 | A | 4/2016 | |
| JP | 2017-133594 | A | 8/2017 | |
| JP | 2017-187059 | A | 10/2017 | |
| WO | WO-2023182445 | A1 * | 9/2023 | F16H 57/02 |
| WO | WO-2023182447 | A1 * | 9/2023 | F16H 7/035 |
| WO | WO-2023182449 | A1 * | 9/2023 | F16H 57/00 |
| WO | WO-2023182450 | A1 * | 9/2023 | F16H 57/04 |
| WO | WO-2023182451 | A1 * | 9/2023 | F16H 61/662 |
| WO | WO-2023182453 | A1 * | 9/2023 | F16H 57/02 |
| WO | WO-2023182454 | A1 * | 9/2023 | F16H 57/02 |
| WO | WO-2023182455 | A1 * | 9/2023 | F16H 57/03 |
| WO | WO-2023182456 | A1 * | 9/2023 | F16H 57/00 |

* cited by examiner

POWER TRANSMISSION DEVICE

CROSS-REFERENCE TO RELATED APPLICATIONS

This application is a U.S. national stage application of International Application No. PCT/JP2023/011609, filed on Mar. 23, 2023. This application also claims priority to Japanese Patent Application No 2022-047605, filed on Mar. 23, 2022.

BACKGROUND

Technical Field

The present invention relates to a power transmission device.

Background Information

Japanese Patent Laid-Open Publication No. 2006-105187 discloses a transmission (power transmission device) provided with an oil cooler.

SUMMARY

In the transmission of Japanese Patent Laid-Open Publication No. 2006-105187, an oil cooler is attached to a side surface of the transmission housing toward the vehicle front side. As viewed from the front of the vehicle, the oil cooler is provided with a range in the direction of the axis of rotation, and is oriented in the direction of the axis of rotation of the transmission.

If the control valve of the transmission is to be arranged upright toward the front of the vehicle, the installation location of the oil cooler becomes an issue.

For example, simply arranging the control valve and the oil cooler side by side would result in an increase in the size of the housing.

Therefore, there is a need to suppress an increase in size of the housing when the oil cooler is installed.

One aspect of the present disclosure is a power transmission device for a vehicle, having a housing that accommodates a power transmission mechanism, a control valve that controls the pressure of the oil supplied to the power transmission mechanism, a heat exchanger that cools the oil, a first chamber that accommodates the power transmission mechanism, and a second chamber in which the control valve is arranged upright, wherein the housing has a case, a first cover that is joined to the case from the direction of the axis of rotation of the power transmission mechanism, forming the first chamber the case, and a second cover that is joined to the case from the direction of the axis of rotation of the power transmission mechanism toward the front of the vehicle, forming the second chamber and the case, the heat exchanger is mounted toward the front of the vehicle on the first cover, and as viewed from the direction of the axis of rotation of the power transmission mechanism, at least part of the heat exchanger is provided in a positional relationship overlapping the control valve.

According to one aspect of the present disclosure, an increase in the size of the housing can be suppressed.

BRIEF DESCRIPTION OF THE DRAWINGS

Referring now to the attached drawings which form a part of this original disclosure.

DETAILED DESCRIPTION

Figure 1:
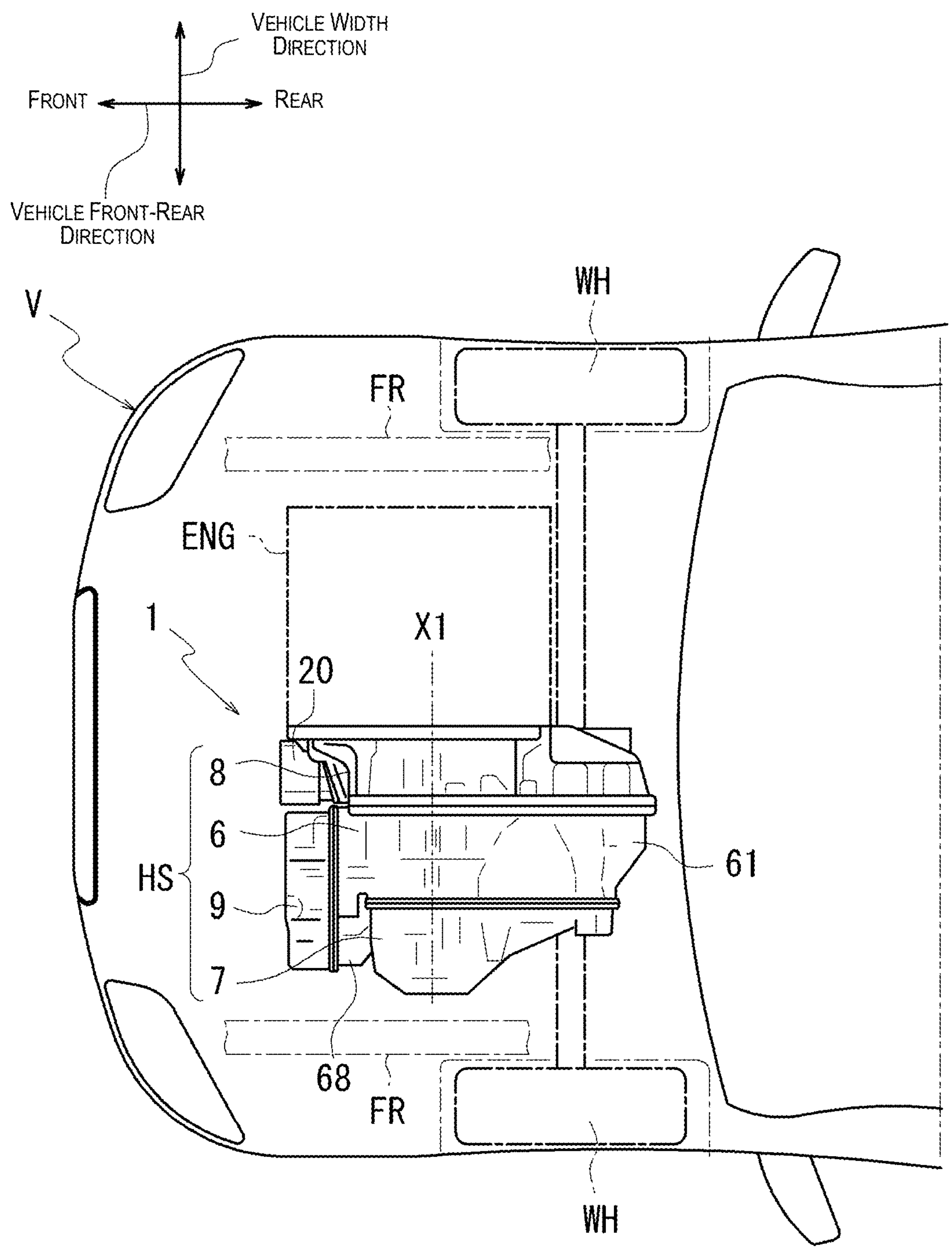
FIG. 1 is a schematic diagram illustrating the arrangement of the power transmission device in a vehicle.

First, definitions of terminology in the present specification will be explained.

A power transmission device is a device having at least a power transmission mechanism, where the power transmission mechanism is, for example, at least one of a gear mechanism, a differential gear mechanism, or a reduction gear mechanism.

In the following embodiment, a case is illustrated in which a power transmission device 1 has a function for transmitting the output rotation of an engine, but the power transmission device 1 need only transmit the output rotation of at least one of an engine or a motor (rotating electrical machine). Note that if the power transmission device is a device transmitting the output rotation of a motor, the term "control unit" in this specification means an inverter.

"Overlaps as viewed from a prescribed direction" means that a plurality of elements are arranged in a prescribed direction, and means the same as "overlapping in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown arranged in a prescribed direction in the drawings, it may be assumed that there is text in the description in the specification indicating that the plurality of elements overlap when viewed in the prescribed direction.

"Not overlapping as viewed in a prescribed direction" and "offset when viewed in a prescribed direction" mean that a plurality of elements are not arranged in the prescribed direction, and mean the same as "not overlapping in a prescribed direction" and "offset in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown not arranged in a prescribed direction in the drawings, it may be assumed that there is text in the description in the specification indicating that the plurality of elements do not overlap when viewed in the prescribed direction.

"As viewed from a prescribed direction, a first element (part, section, etc.) is located between a second element (part, section, etc.) and a third element (part, section, etc.)" means that when viewed from the prescribed direction, the first element can be seen between the second element and the third element. The "prescribed direction" is, for example, the axial direction, radial direction, direction of gravity, direction of travel of the vehicle (forward movement direction of the vehicle, rearward movement direction of the vehicle), etc.

For example, if the second element, the first element, and the third element are arranged in that order in the axial direction, then the first element is located between the second element and the third element when viewed from the radial direction. If the first element is shown between the second element and the third element as viewed from a prescribed direction in the drawings, it may be assumed that there is text in the description in the specification describing the first element between the second element and the third element as viewed from the prescribed direction.

When two elements (parts, sections, etc.) overlap as viewed from the axial direction, the two elements are coaxial.

"Axial direction" means the axial direction of the axis of rotation of a part making up the device. "Radial direction" means a direction orthogonally intersecting the axis of rotation of the part making up the device. The part is, for example, a motor, a gear mechanism, a differential gear mechanism, or the like.

"The downstream side in the direction of rotation" means the downstream side in the direction of rotation when the vehicle is advancing or the direction of rotation during vehicle forward movement or during vehicle backward movement. It is appropriate to assume the downstream side in the direction of rotation is during vehicle forward movement, which is frequently the case.

"Upright" with reference to the control valve means that in the case of a control valve having a basic configuration with a separation plate sandwiched between valve bodies, the valve bodies of the control valve are stacked in the horizontal line direction based on the state of installation of the power transmission device in the vehicle. The "horizontal line direction" here does not mean the horizontal line direction in the strict sense, but also includes cases in which the direction of stacking is at an angle relative to the horizontal line.

Further, "upright" with respect to the control valve means that the control valve is arranged with the plurality of pressure regulating valves inside the control valve aligned in the direction of a vertical line VL based on the state of installation of the power transmission device in the vehicle.

"The plurality of pressure regulating valves aligned in the direction of a vertical line VL" means that the regulating valves inside the control valve are arranged spaced out in the direction of the vertical line VL In this case, the plurality of pressure regulating valves need not be strictly arranged in single file in the direction of the vertical line VL.

For example, if the plurality of valve bodies are stacked to form the control valve, the plurality of pressure regulating valves may be arranged in the direction of the vertical line VL with shifted positions in the direction of stacking of the valve bodies in the upright control valve.

Further, as viewed from the axial direction of the valve bodies provided on the pressure regulating valves (the direction of forward and backward movement), the plurality of pressure regulating valves need not be arranged with gaps in between in the direction of the vertical line VL.

As viewed from the axial direction of the valve bodies provided with the pressure regulating valves (the direction of forward and backward movement), the plurality of pressure regulating valves need not be adjacent in the direction of the vertical line VL.

Hence, if, for example, the pressure regulating valves arranged in the direction of the vertical line VL are arranged with shifted positions in the stacking direction (horizontal line direction) of the valve bodies, then cases are also included in which, as viewed from the stacking direction, the pressure regulating valves that are adjacent in the direction of the vertical line VL are provided in a partially overlapping positional relationship.

Further, that the control valve is "upright" means that the plurality of pressure regulating valves inside the control valve are arranged in the direction of movement of the valve bodies (spool valves) provided in the pressure regulating valves aligned in the horizontal line direction.

The direction of movement of the valve bodies (spool valves) in this case is not limited to the horizontal line direction in the strict sense. The direction of movement of the valve bodies (spool valves) in this case is a direction along an axis of rotation X of the power transmission device. In this case, the direction of the axis of rotation X and the sliding direction of the valve bodies (spool valves) are the same.

An embodiment of the present disclosure is described below.

FIG. 1 is a schematic diagram illustrating the arrangement of a power transmission device 1 in a vehicle V.

Figure 2:
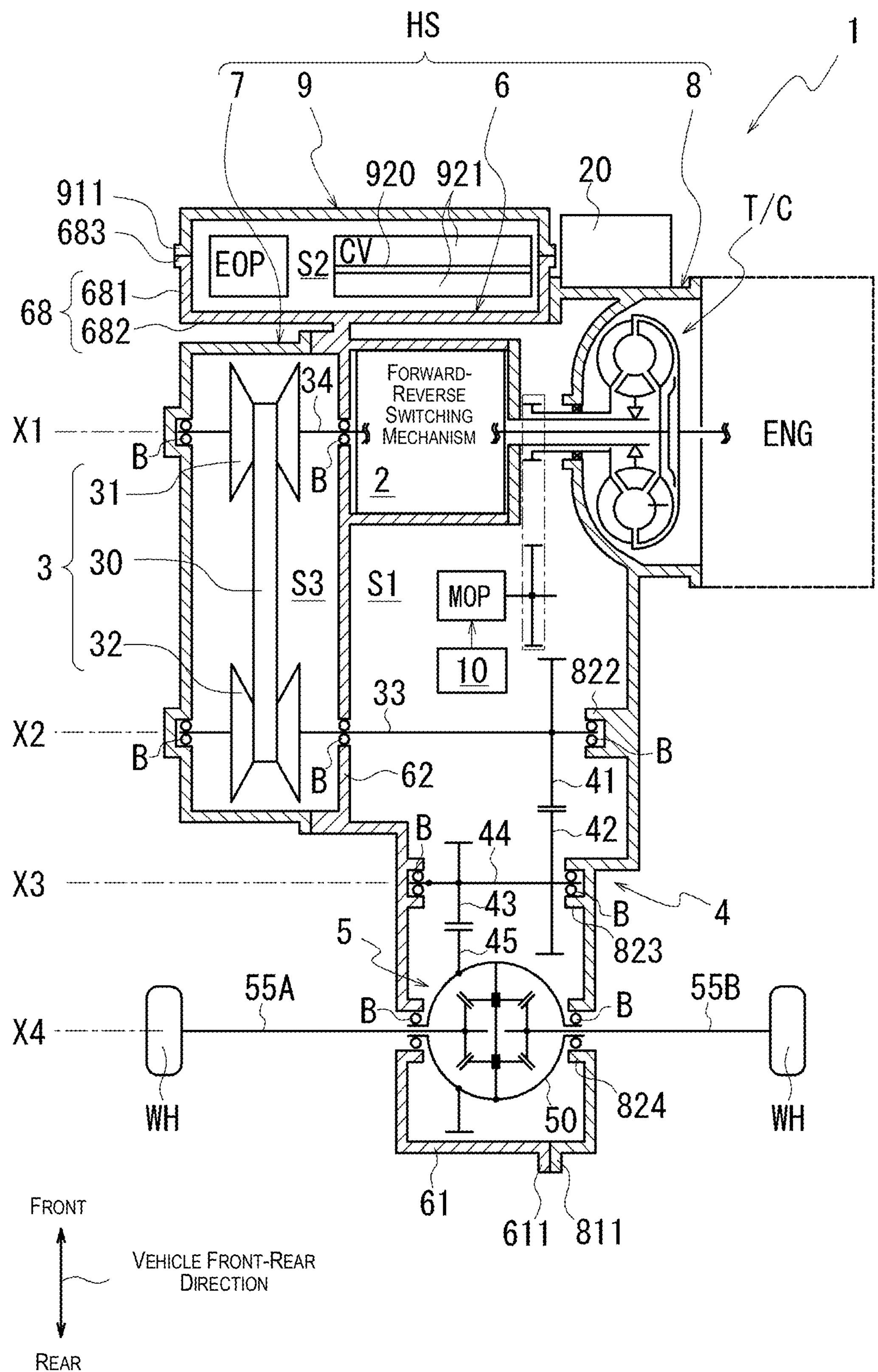
FIG. 2 is a schematic diagram illustrating a general configuration of the power transmission device.

FIG. 2 is a schematic diagram illustrating a general configuration of the power transmission device 1.

As shown in FIG. 1, the power transmission device 1 in the front of the vehicle V is arranged between left and right frames FR, FR. A housing HS of the power transmission device 1 is configured by a case 6, a side cover 7, a torque converter cover 8, and a front cover 9.

As shown in FIG. 2, the interior of the housing HS accommodates a torque converter T/C, a forward-reverse switching mechanism 2, a variator 3, a reduction mechanism 4, a differential drive device 5, an electronic oil pump EOP, a mechanical oil pump MOP, a control valve CV, etc. The torque converter T/C is housed inside the torque converter cover 8.

In the power transmission device 1, output rotation of an engine ENG (the drive source) is input into the forward-reverse switching mechanism 2 via the torque converter T/C.

The rotation input to the forward-reverse switching mechanism 2 is forward rotation or reverse rotation and is input to a primary pulley 31 of the variator 3.

In the variator 3, changing the winding radius of a belt 30 in the primary pulley 31 and a secondary pulley 32 causes the rotation input to the primary pulley 31 to be shifted at a desired gear ratio and output by an output shaft 33 of the secondary pulley 32.

Output rotation of the secondary pulley 32 is input via the reduction mechanism 4 into the differential drive mechanism 5 (differential gear mechanism) and is then transmitted to drive wheels WH, WH via left and right drive shafts 55A, 55B.

The reduction mechanism 4 has an output gear 41, an idler gear 42, a reduction gear 43, and a final gear 45.

The output gear 41 rotates together with the output shaft 33 of the secondary pulley 32.

The idler gear 42 meshes with the output gear 41 in a manner allowing transmission of rotation. The idler gear 42 is spline-fitted to an idler shaft 44 and rotates together with the idler shaft 44. The idler shaft 44 is provided with the reduction gear 43 that has a smaller radius than the idler gear 42. The reduction gear 43 meshes with the final gear 45 that is fixed to the outer circumference of a differential case 50 of the differential device 5 in a manner allowing transmission of rotation.

In the power transmission device 1, the forward-reverse switching mechanism 2, the torque converter T/C, and the output shaft of the engine ENG are arranged coaxially (concentrically) along an axis of rotation X1 (first axis) of the primary pulley 31.

The output shaft 33 of the secondary pulley 32 and the output gear 41 are arranged coaxially along an axis of rotation X2 (second axis) of the secondary pulley 32.

The idler gear 42 and the reduction gear 43 are arranged coaxially along a common axis of rotation X3 (third axis).

The final gear 45 and the drive shafts 55A, 55B are arranged coaxially on a common axis of rotation X4 (fourth axis). In the power transmission device 1, the axes of rotation X1-X4 are set to have a positional relationship parallel to each other. In the following, these axes of rotation X1-X4 may, as needed, be referred to as the axis of rotation X of the power transmission device 1 (power transmission mechanism).

Figure 3:
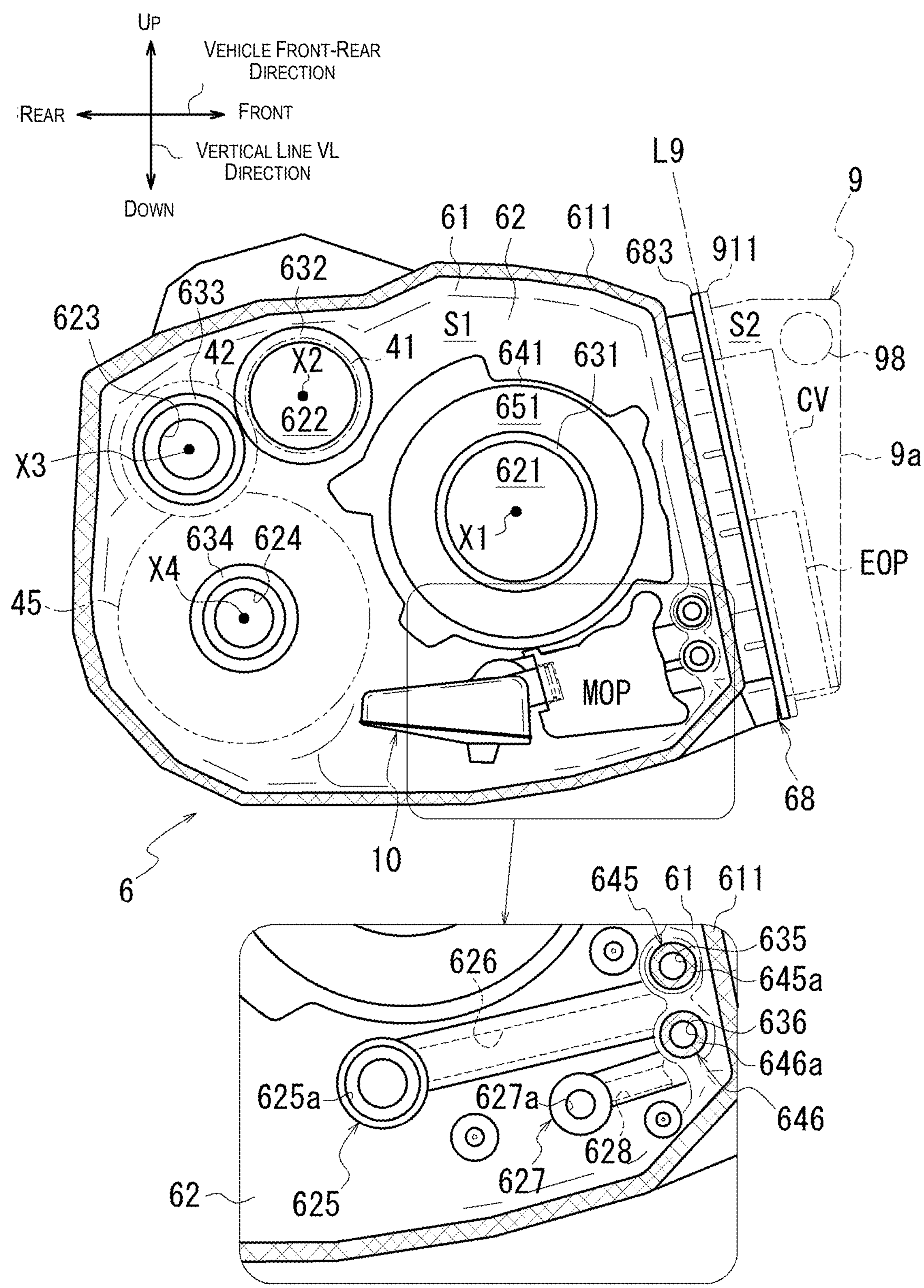
FIG. 3 is a diagram of a case as viewed from the second cover side.

FIG. 3 is a plan view of the case 6 as viewed from the torque converter cover 8 side. In FIG. 3, the front cover 9 is indicated by dashed lines. The front cover 9 is joined to a housing section 68 attached to the side of the case 6 toward the front of the vehicle, forming a housing chamber S2 with the housing section 68. Note that in the enlarged view of FIG. 3, a strainer 10 and the mechanical oil pump MOP are omitted, showing the areas around the connecting sections 625, 627 provided in a partition section 62.

As shown in FIG. 3, the case 6 has a cylindrical circumferential wall section 61 and the partition section 62. The partition section 62 cuts across the axes of rotation (axes of rotation X1 to X4) of the power transmission mechanism.

As shown in FIG. 2, the partition section 62 divides the space inside the circumferential wall section 61 in two in the direction of the axis of rotation X1. One side of the partition section 62 in the direction of the axis of rotation X1 is a first chamber S1, and the other side is a third chamber S3.

The first chamber S1 accommodates the forward-reverse switching mechanism 2, the reduction mechanism 4, and the differential device 5. The third chamber S3 accommodates the variator 3.

In the case 6, an opening on the first chamber S1 side is sealed by the torque converter cover 8. The third chamber S3 side opening is sealed by the side cover 7.

In the case 6, oil used for the operation of the power transmission device 1 or lubrication of the component elements of the power transmission device 1 is collected below the space between the side cover 7 and the torque converter cover 8 (first chamber S1 and third chamber S3).

As shown in FIG. 3, the end surface of the case 6 facing the torque converter cover 8 side (toward the viewer) is a joining section 611 with the torque converter cover 8. The joining section 611 is a flanged section that surrounds the entire circumference of the opening on the torque converter cover 8 side of the partition section 62. The joining section 611 is joined to the entire circumference of the joining section 811 on the torque converter cover 8 side (see FIG. 2). The case 6 and the torque converter cover 8 are connected by bolts, not shown, to join the joining sections 611, 811 together.

The opening of the case 6 is thus held in a state sealed by the torque converter cover 8, forming the closed first chamber S1.

As shown in FIG. 3, in the case 6, the partition section 62 is located inside the joining section 611.

The partition section 62 of the case 6 is provided in a direction essentially orthogonal to the axes of rotation (axes of rotation X1 to X4). Through-holes 621, 622, 624 and a support hole 623 are formed in the partition section 62.

The through-hole 621 is formed around the axis of rotation X1. A cylindrical support wall section 631 surrounding the through-hole 621 and a circumferential wall section 641 surrounding the outer circumference of the cylindrical support wall section 631 with a space in between are provided in the surface of the partition section 62 facing the first chamber S1 (toward the viewer). The cylindrical support wall section 631 and the circumferential wall section 641 project toward the viewer in FIG. 3 (toward the second cover 8 in FIG. 2).

The region 651 between the support wall section 631 and the circumferential wall section 641 is a cylindrical space that accommodates a piston (not shown) of the forward-reverse switching mechanism 2, friction plates (forward clutch, reverse brake), etc.

An input shaft 34 (see FIG. 2) of the primary pulley 31 is rotatably supported on the inner circumference of the cylindrical support wall section 631 via bearings B.

As shown in FIG. 3, the through-hole 622 is formed around the axis of rotation X2.

In the power transmission device 1 mounted in the vehicle V, the axis of rotation X2 is positioned diagonally above toward the rear of the vehicle as viewed from the axis of rotation X1.

A cylindrical support wall section 632 that surrounds the through-hole 622 is provided in the surface of the partition section 62 facing the first chamber S1 (toward the viewer). The support wall section 632 projects toward the viewer in FIG. 3 (toward the side of the torque converter cover 8 in FIG. 2).

The inner circumference of the support wall section 632 supports the output shaft 33 (see FIG. 2) of the secondary pulley 32 rotatably via the bearings B.

As shown in FIG. 3, the support hole 623 is a closed-bottom hole formed around the axis of rotation X3.

In the power transmission device 1 mounted in the vehicle V, the axis of rotation X3 is positioned diagonally above toward the rear of the vehicle as viewed from the axis of rotation X1, and diagonally below toward the rear of the vehicle as viewed from the axis of rotation X2.

A cylindrical support wall section 633 that surrounds the support hole 623 is provided on the surface of the partition section 62 on the first chamber S1 side (toward the viewer). In FIG. 3, the support wall section 633 protrudes toward the viewer (the torque converter cover 8 side in FIG. 2). The support wall section 633 surrounds the outer circumference of the support hole 623 with a gap therebetween. The inner circumference of the support wall section 633 rotatably supports one end of the idler shaft 44 of the reduction mechanism 4 (see FIG. 2) via the bearings B.

As shown in FIG. 3, the through-hole 624 is formed around the axis of rotation X4.

In the power transmission device 1 mounted in the vehicle V, the axis of rotation X4 is positioned diagonally below toward the rear of the vehicle as viewed from the axis of rotation X1, diagonally below toward the rear of the vehicle as viewed from the axis of rotation X2, and diagonally below toward the front of the vehicle as viewed from the axis of rotation X3.

On the surface of the partition section 62 on the first chamber S1 side (toward the viewer), a cylindrical support wall section 634 that surrounds the through-hole 624 is provided. In FIG. 3, the support wall section 634 protrudes toward the viewer (the torque converter cover 8 side in FIG. 2). The support wall section 634 surrounds the outer circumference of the through-hole 624 with a gap therebetween. The inner circumference of the support wall section 634 rotatably supports the differential case 50 of the differential device 5 (see FIG. 2) via bearings B.

As shown in FIG. 2, the final gear 45, in the form of a ring as viewed from the direction of the axis of rotation X4, is fixed to the outer circumference of a differential case 50. The final gear 45 rotates about the axis of rotation X4 together with the differential case 50.

In the case 6 shown in FIG. 3, in a region below the arcuate circumferential wall section 641 and farther toward the front of the vehicle than the final gear 45, the strainer 10 is provided.

In the partition section 62, as shown in FIG. 3, the connecting section 625 with the strainer 10 and the connecting section 627 with the mechanical oil pump MOP are provided below the circumferential wall section 641.

A connection port 625*a* of the connection section 625 and a connection port 627*a* of the connecting section 627 open in the same direction. The connection port 625*a* of the connecting section 625 communicates with an oil path 626 provided in the partition section 62. The connection port 627*a* of the connecting section 627 communicates with an oil path 628 provided in the partition section 62.

The oil paths 626, 628 extend in straight lines toward the housing section 68 (to the right in the diagram) inside the partition section 62. The oil path 626 connects to the electric oil pump EOP (see FIG. 2) housed in the housing section 68 via the oil paths inside the case 6. The oil path 628 connects to the control valve CV installed in the housing section 68 via an oil path inside the case 6.

As shown in FIG. 3, in the lower part of the partition section 62 toward the front of the vehicle, bosses 645 and 646 are provided near the region where the oil path 626 described above intersects the circumferential wall section 61.

The bosses 645 and 646 are cylindrical members that surround the first oil path 635 and the second oil path 636, respectively.

The bosses 645 and 646 project toward the viewer (toward the torque converter cover 8 side). The front end surfaces 645*a* and 646*a* of the bosses 645 and 646 toward the viewer are flat surfaces located in the same plane as the joining section 611 on the case 6 side.

The bosses 645 and 646 are arranged vertically aligned near the circumferential wall section 61. The boss 645 is positioned above the boss 646 in the direction of the vertical line VL. The housing section 68 for the control valve CV is located on the opposite side of the boss sections 645 and 646 as viewed from the circumferential wall section 61 (to the right in the diagram).

A first oil path 635 within the boss 645 and a second oil path 636 within the boss 646 are each connected to the control valve CV.

The opening directions of the first oil path 635 and the second oil path 636 are the same as the opening directions of the connection port 625*a* of the connecting section 625 and the connection port 627*a* of the connecting section 627.

The first oil path 635 and the second oil path 636 are provided with the openings facing the viewer (toward the side of the torque converter cover 8).

Figure 4:
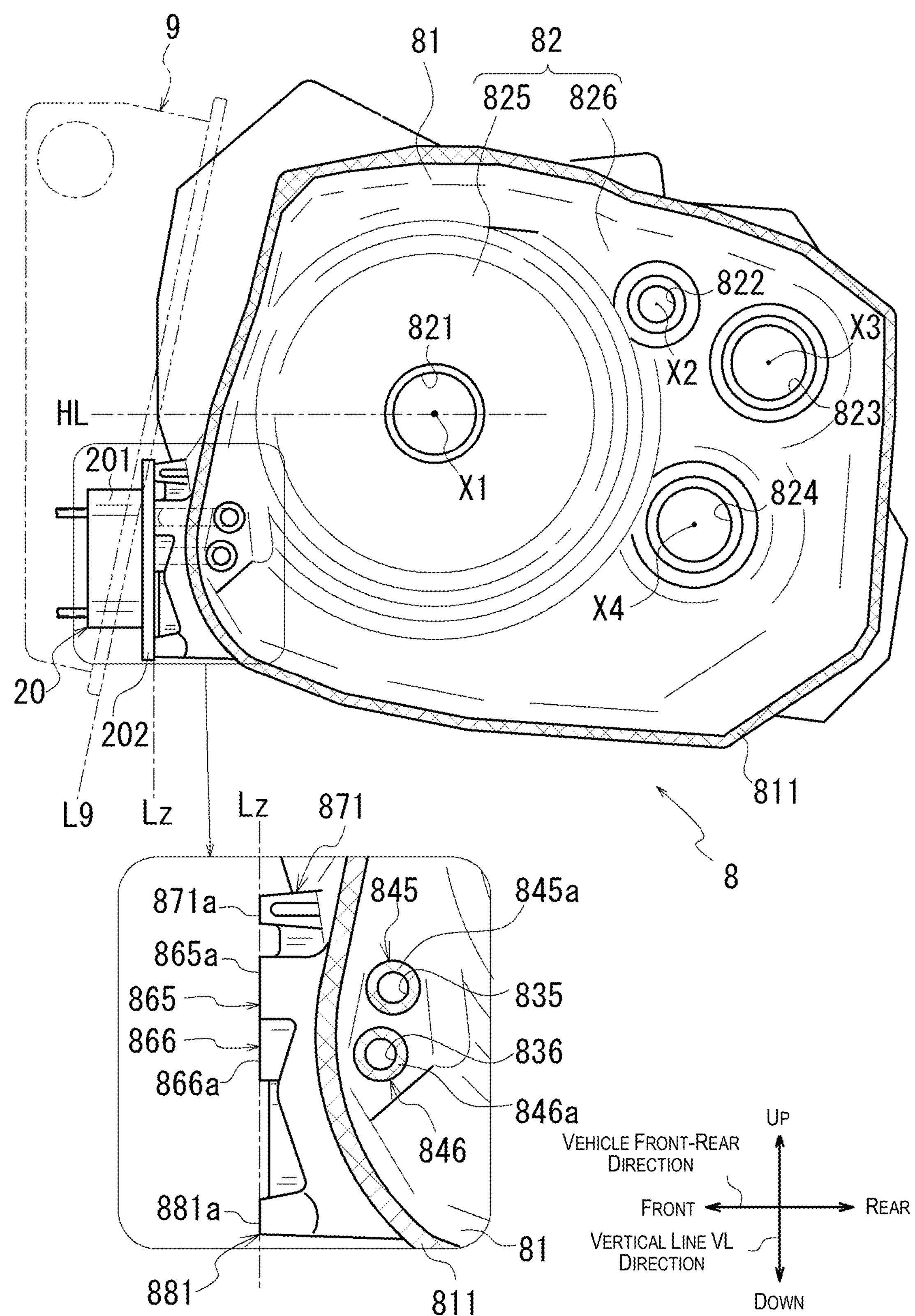
FIG. 4 is a diagram of the second cover as viewed from the case side.

FIG. 4 is a plan view of the torque converter cover 8 as viewed from the side of the case 6. In FIG. 4, the torque converter cover 8 is shown along with an oil cooler 20 that is attached to the outer circumference of the circumferential wall section 81 of the torque converter cover 8. The enlarged view in FIG. 4 omits the oil cooler 20.

In FIG. 4, the front cover 9 is indicated in dashed lines in order to clarify the positional relationship between the front cover 9 and the oil cooler 20.

Figure 5:
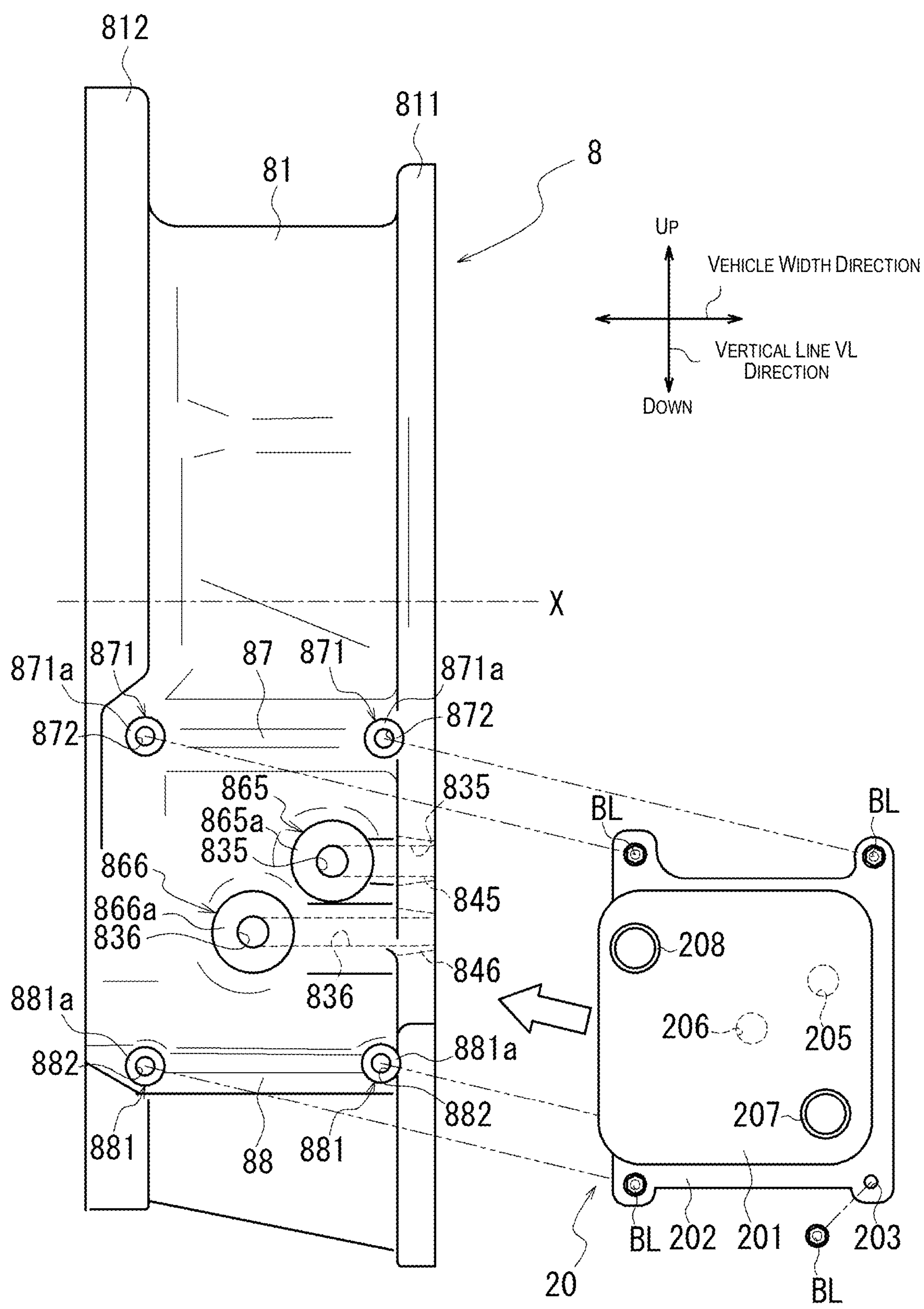
FIG. 5 is a diagram of the second cover as viewed from the front of the vehicle.

FIG. 5 is a lateral view of the torque converter cover 8 as viewed from the front of the vehicle. The torque converter cover 8 is shown along with the oil cooler 20 attached to the side of the torque converter cover 8.

Figure 6:
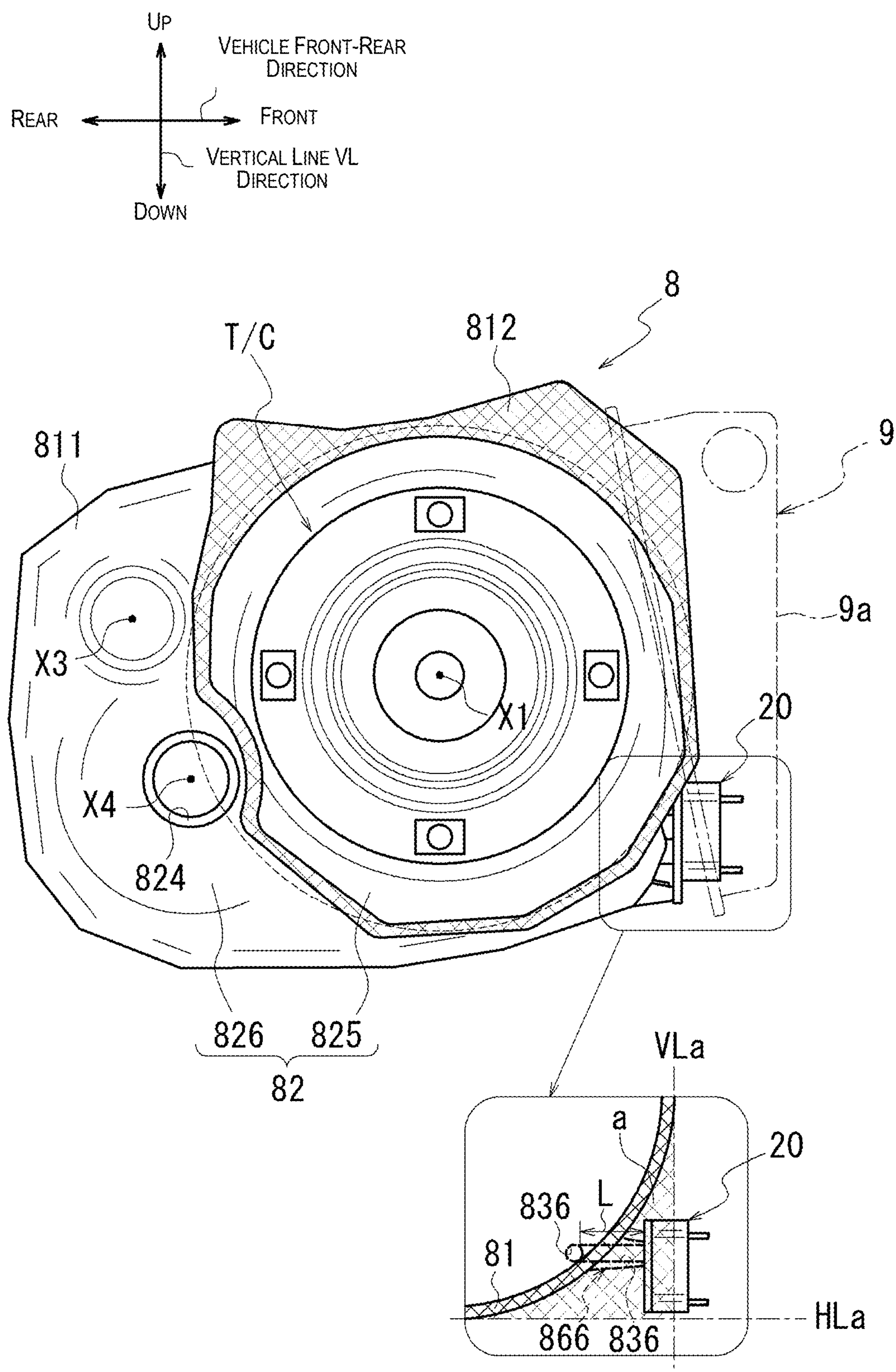
FIG. 6 is a diagram of the second cover as viewed from the engine side.

FIG. 6 is a plan view of the torque converter cover 8 as viewed from the engine ENG side. In FIG. 6, the torque converter T/C housed inside a first region 825 is shown superimposed on the torque converter cover 8. The enlarged view in FIG. 6 schematically illustrates the positional relationship between the outer circumference of the circumferential wall section 81 of the torque converter cover 8 and the oil cooler 20 attached to the outer circumference of the wall section 81. The front cover 9 is indicated in dashed lines in FIG. 6 in order to clarify the positional relationship between the front cover 9 and the oil cooler 20.

Figure 7:
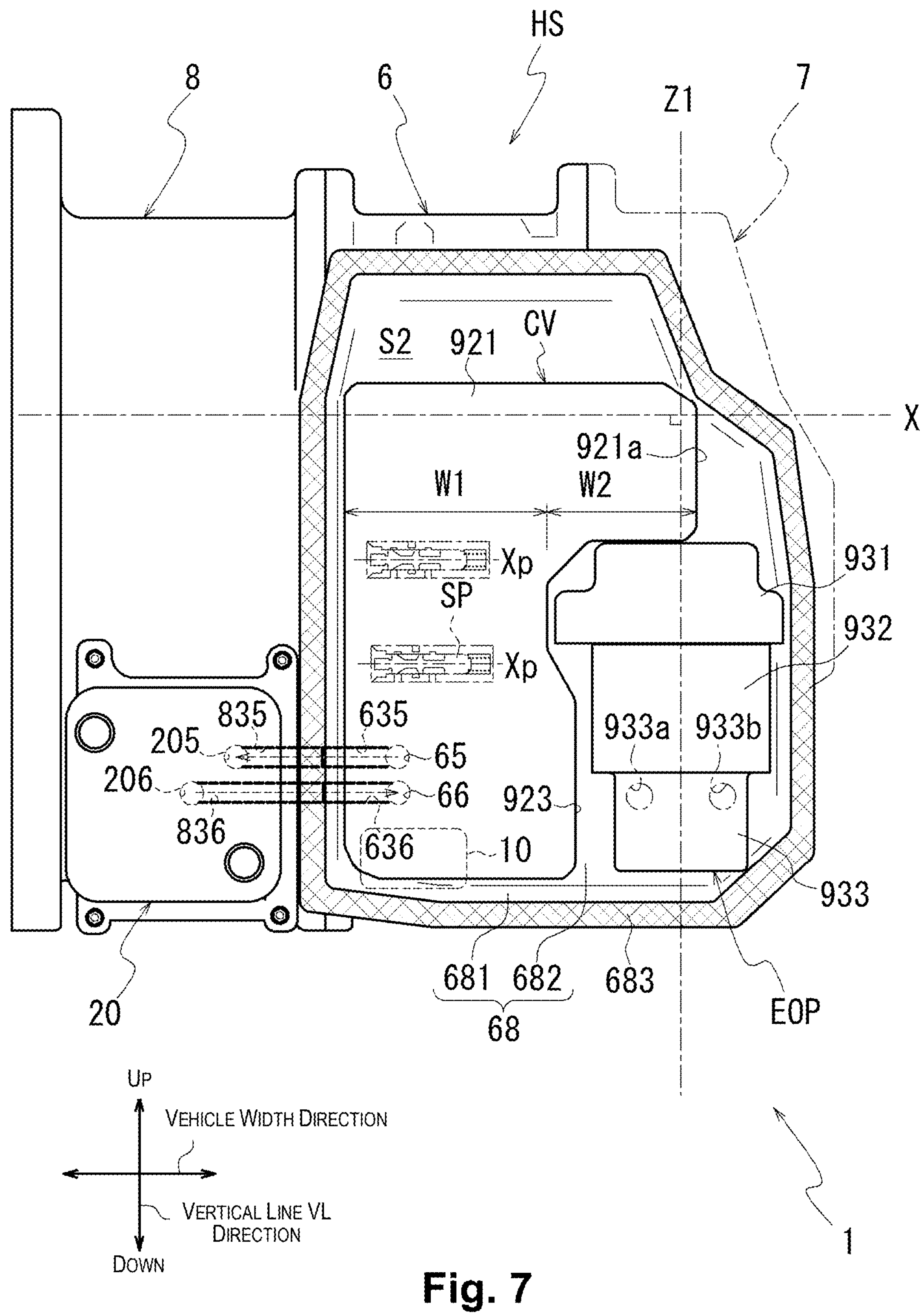
FIG. 7 is a diagram illustrating the arrangement of a control valve and an oil cooler in the housing toward the front of the vehicle.

FIG. 7 is a diagram illustrating the arrangement of the control valve CV and the oil cooler 20 on the vehicle front side of the housing HS. FIG. 7 shows the housing HS as viewed from the front of the vehicle, with crosshatching applied to the region intersecting the joining section 683 of the housing section 68 on the side toward the viewer.

As shown in FIG. 4, the torque converter cover 8 has a cylindrical circumferential wall section 81 and a partition section 82. The partition section 82 is provided across a range that crosses the axes of rotation (axes of rotation X1 to X4) of the power transmission mechanism.

The case 6 side end surface (toward the viewer) of circumferential wall section 81 serves as the joining section 811 with the case 6. The joining section 811 is a flanged section that surrounds the entire circumference of the opening on the torque converter cover 8 side of the partition section 82.

In the torque converter cover 8, the partition section 82 is located inside the joining section 811.

The partition section 82 is provided with through-holes 821, 824 and support holes 822, 823.

The partition section 82 has a first region 825 and a second region 826.

The first region 825 is an essentially circular area around the axis of rotation X1. The first region 825 bulges toward the viewer (toward the first chamber S1 side).

The through-hole 821 is formed around the axis of rotation X1 and is positioned approximately at the center of the first region 825. The second region 826 is the region in the partition section 82 excluding the first region 825.

The second region 826 is provided with support holes 822, 823, and a through-hole 824.

As shown in FIG. 4, the bosses 845 and 846 are provided in the lower part toward the front of the vehicle in the first region 825. The bosses 845 and 846 are cylindrical members that enclose the first connection path 835 and the second connection path 836, respectively.

The bosses 845 and 846 project toward the viewer (toward the case 6 side). The front end surfaces 845*a* and 846*a* of the bosses 845 and 846 toward the viewer are flat surfaces located in the same plane as the joining section 811 on the side of the torque converter cover 8.

The bosses 845 and 846 are arranged vertically aligned near the circumferential wall section 81. The boss 845 is positioned above the boss 846 in the direction of the vertical line VL. As viewed from the circumferential wall section 81, the oil cooler 20 is located on the opposite side from the bosses 645 and 646 (to the left in the diagram).

The first connection path 835 within the boss 845 and the second connection path 836 within the boss 846 are each connected to the oil cooler 20.

The first connection path 835 and the second connection path 836 are provided facing toward the viewer (toward the case 6 side).

The bosses 845 and 846 are located in positions connecting with the bosses 645 and 646, respectively, on the case 6 side when the torque converter cover 8 is assembled to the case 6.

The first oil path 635 within the boss 645 and the second oil path 636 within the boss 646 thereby respectively connect to the first connection path 835 within the boss 845 and the second connection path 836 within the boss 846.

As shown in FIG. 5, in the torque converter cover 8, the bosses 865 and 866 are provided on the side of the circumferential wall section 81 toward the front of the vehicle. The bosses 865 and 866 are cylindrical members that enclose the first connection path 835 and the second connection path 836, respectively.

The first connection path 835 extends in the direction of the axis of rotation X within the circumferential wall section 81 of the torque converter cover 8 and opens in the end surfaces of the bosses 865 and 845.

The second connection path 836 extends in the direction of the axis of rotation X within the circumferential wall section 81 of the torque converter cover 8 and opens in the end surfaces of the bosses 866 and 846.

In the present embodiment, the boss 846 is positioned below the boss 845. Therefore, the second connection path 836 extends below the first connection path 835 in the direction of the axis of rotation X.

Note that the first connection path 835 and the second connection path 836 are bent at a midway position in the longitudinal direction. One end of the first connection path 835 and the second connection path 836 in the longitudinal direction opens toward the axis of rotation X of the power transmission device 1. The other end opens toward a direction orthogonal to the axis of rotation X of the power transmission device 1 (toward the front of the vehicle).

The bosses 865 and 866 project toward the viewer (toward the front of the vehicle). The front end surfaces 865*a* and 866*a* of the bosses 865 and 866 toward the viewer are flat surfaces located in the same plane.

A rib 87 is provided above the bosses 865 and 866 in the direction of the vertical line VL. The rib 87 is provided in a direction along the axis of rotation X. Bolt bosses 871, 871 having bolt holes 872 are provided on the surface of the rib 87 toward the front of the vehicle.

The bolt bosses 871, 871 are spaced apart along the longitudinal direction of the rib 87.

A rib 88 is provided below the bosses 865, 866 in the direction of the vertical line VL. The rib 88 is provided in the direction along the axis of rotation X1. Bolt bosses 881, 881 having bolt holes 882 are provided on the surface of the rib 88 toward the front of the vehicle.

The bolt bosses 881, 881 are spaced apart along the longitudinal direction of the rib 88.

The upper bolt bosses 871, 871 and the lower bolt bosses 881, 881 project toward the front of the vehicle. End surfaces 871*a*, 881*a* of the bolt bosses 871, 881 are flat surfaces located in the same plane.

As shown in FIG. 4, the end surfaces 871*a*, 881*a* of the bolt bosses 871, 881 and the end surfaces 865*a*, 866*a* of the bosses 865, 866 are located on a straight line Lz along the vertical line VL direction. In the present embodiment, the end surfaces 865*a*, 866*a*, 871*a*, 881*a* located on the vertical line VL serve as an attachment surface for the oil cooler 20. The attachment surface of the oil cooler 20 (straight line Lz) is positioned farther toward the rear of the vehicle than a straight line L9 along the surface joining the housing section 68 and the front cover 9 described below. Further, the mounting surface of the oil cooler 20 (straight line Lz) is above the oil cooler 20 and intersects the straight line L9.

The oil cooler 20 has a cubic main body 201 and a plate part 202 that covers the surface of the main body 201 on the side of the torque converter cover 8 (right side in FIG. 4). As shown in FIG. 5, bolt insertion holes 203 for bolts BL are provided at the four corners of the plate part 202. The oil cooler 20 is fixed to the side surface of the torque converter cover 8 by screwing the bolts BL, which have passed through the insertion holes 203 of the plate part 202, into the bolt holes 872, 882 of the bolt bosses 871, 881.

An inlet 205 and an outlet 206 are provided on the surface of the oil cooler 20 facing the torque converter cover 8. When the oil cooler 20 is fixed to the side of the torque converter cover 8, the inlet 205 communicates with the first connection path 835, and the outlet 206 connects with the second connection path 836. An intake port 207 and a discharge port 208 for cooling water are provided on the end surface of the oil cooler 20 toward the viewer (toward the front of the vehicle). Inside the main body 201, oil OL supplied through the first connection path 835 flows in through the inlet 205. The oil OL that flows into the main body 201 is discharged from the outlet 206 to the second connection path 836.

A cooling pipe (not shown) connecting the intake port 207 and the discharge port 208 is provided inside the main body 201. In the oil cooler 20, the oil OL is cooled through heat exchange between a cooling medium flowing through the cooling pipe and the oil OL moving through the main body 201 from the inlet 205 to the outlet 206.

As shown in FIG. 6, when the torque converter cover 8 is viewed from the engine ENG side, the oil cooler 20 is provided at the bottom of the torque converter cover 8 toward the front of the vehicle.

The region of the circumferential wall section 81 of the torque converter cover 8 toward the front of the vehicle forms an arcuate shape along the outer circumference of the torque converter T/C, which forms a circle as viewed from the direction of the axis of rotation X1.

Therefore, as shown in the enlarged view in FIG. 6, in the lower part toward the front of the vehicle, there is extra space in the region a enclosed by a tangent VLa of the circumferential wall section 81 extending in the vertical line direction, a horizontal line HLa extending in the horizontal line direction, and the outer circumference of the circumferential wall section 81.

In the present embodiment, the oil cooler 20 is arranged so that at least part of the oil cooler 20 is located in the region a.

Thus, the oil cooler 20 is positioned without significantly projecting downwards in the vertical line VL direction or forwards in the vehicle front-rear direction. This prevents a significant increase in size of the power transmission device 1 in the vertical line direction or the vehicle front-rear direction when installing the oil cooler 20.

Additionally, by positioning the oil cooler 20 closer to the circumferential wall section 81, a length L of the bosses 865 and 866, which connect to the inlet 205 and the outlet 206 of the oil cooler 20, can be reduced.

As a result, as shown in FIG. 7, the length of the oil paths connecting the oil cooler 20 and the control valve CV (the first oil path 635 and the first connection path 835, and the second oil path 636 and the second connection path 836) can be further reduced. Consequently, the oil path resistance acting on the oil OL flowing through the oil paths can be reduced. This can be expected to reduce the load on the oil pumps (the electric oil pump EOP and the mechanical oil pump MOP).

Further, by positioning the oil cooler 20 closer to the circumferential wall section 81, the oil cooler 20 is provided in a position overlapping the front cover 9 as viewed from the direction of the axis of rotation X1. In this state, the oil cooler 20 is arranged to avoid projecting toward the front of the vehicle beyond an end surface 9*a* of the front cover 9 toward the front of the vehicle (see FIG. 3).

As shown in FIG. 7, the oil cooler 20 is provided adjacent to the housing section 68 on the side of the case 6 at the bottom of the power transmission device 1.

As shown in FIG. 2, the housing section 68 is attached to the side surface of the case 6 toward the front of the vehicle.

The housing section 68 is provided with the opening facing the front of the vehicle. The housing section 68 is arranged in the direction along the axis of rotation X1. As viewed from the radial direction of the axis of rotation X1, the housing section 68 is formed having a range in the direction of the axis of rotation X1 from the region of the circumferential wall section 61 of the case 6 to the side of the side cover 7.

As shown in FIG. 2, a region of approximately half of the bottom wall section 682 of the housing section 68 on the engine ENG side is integrated with the circumferential wall section 61. The region of the other approximately half of the bottom wall section 682 is provided with a gap on the outer circumference of the side cover 7, extending from the circumferential wall section 61.

As shown in FIG. 7, as viewed from the front of the vehicle, the housing section 68 has a surrounding wall 681 that encircles the entire outer circumference of the bottom wall section 682. The end surface of the surrounding wall 681 toward the viewer serves as the joining section 683 with the front cover 9. The joining section 683 is a flanged section that surrounds the entire opening on the front cover 9 side of the surrounding wall 681.

As shown in FIG. 2, the joining section 683 is joined around the entire circumference with the joining section 911 on the front cover 9 side. The housing section 68 and the front cover 9 are connected by bolts, not shown, with the joining sections 683, 911 joined together. This maintains the opening of the housing section 68 in a state sealed by the front cover 9, forming the closed housing chamber S2.

As shown in FIG. 3, the straight line L9 along the surface where the joining section 683 on the side of the housing section 68 joins the joining section 911 on the side of the front cover 9 is at an angle relative to the vertical line VL.

Inside the housing chamber S2, in addition to the control valve CV and the electric oil pump EOP, a control connector 98 is housed. The control connector 98 is positioned toward the front of the vehicle on the control valve CV, the connection section for the mating connector arranged facing the engine ENG side (toward the viewer).

In the present embodiment, by arranging the control valve CV and the electric oil pump EOP tilted relative to the vertical line VL, extra space is ensured in the upper part of the housing chamber S2 for disposing the control connector 98. With the power transmission device 1 mounted in the vehicle V, the end surface 9*a* of the front cover 9 toward the front of the vehicle is arranged to be aligned with the vertical line VL.

The housing chamber S2 accommodates the control valve CV and the electric oil pump EOP.

As shown in FIG. 2, the control valve CV has a basic configuration in which a separation plate 920 is sandwiched between valve bodies 921, 921. Inside the control valve CV, an oil pressure control circuit 95 (see FIG. 8) is formed. The oil pressure control circuit 95 is provided with pressure regulating valves (spool valves) that operate based on a solenoid driven by commands from a control device (not shown) and the signal pressure generated by the solenoid.

As shown in FIG. 7, in the housing chamber S2, the control valve CV is upright, so that the direction of stacking of the valve bodies 921, 921 is aligned in the front-rear direction of the vehicle (toward and away from the viewer).

In the housing chamber S2, the control valve CV is upright so as to satisfy the following conditions. (a) A plurality of pressure regulating valves SP (spool valves) inside the control valve CV are aligned in the vertical line VL direction (vertical direction) based on the state of installation of the power transmission device 1 in vehicle V, and (b) a direction of advancement and retraction Xp of the pressure regulating valves SP (spool valves) is along the horizontal line direction.

Advancement and retraction of the pressure regulating valves SP (spool valves) is thus not hindered, and the control valve CV is upright in the housing chamber S2. Thus, the housing chamber S2 is prevented from becoming larger in the front-rear direction of the vehicle.

As shown in FIG. 7, the control valve CV, as viewed from the front of the vehicle, forms an approximate L-shape provided with a cut-out 923 in the essentially rectangular valve body 921. The cut-out 923 in the housing chamber S2 is located under the region overlapping the side cover 7.

As viewed from the front of the vehicle, the cut-out 923 is shown to house the electric oil pump EOP.

The electric oil pump EOP has a basic configuration in which a control unit 931, a motor unit 932, and a pump unit 933 are arranged in a straight line in the direction of an axis of rotation Z1 of the motor.

The electric oil pump EOP is provided such that the axis of rotation Z1 is orthogonal to the axis of rotation X of the power transmission device 1. In this state, the pump unit 933 is located at the very bottom of the housing chamber S2. An intake port 933*a* and a discharge port 933*b* of the pump unit 933 are located on the boundary toward the motor unit 932 and are each connected to an oil path inside the case.

The intake port 933*a* is connected to the strainer 10 via the oil path in the case and the oil path 626 inside the partition section 62 (see FIG. 3).

The strainer 10 is housed in the first chamber S1, separately from the housing chamber S2 of the control valve CV (see FIG. 3). In FIG. 5, as viewed from the front of the vehicle, the strainer 10 is arranged at the position indicated by the dashed lines, away from the viewer behind the housing chamber S2.

In the present embodiment, by positioning the pump unit 933 of the electric oil pump EOP at the very bottom of the housing chamber S2, the vertical line VL direction position of the intake port 933*a* of the pump unit 933 is brought closer to the strainer 10.

The length of the oil path connecting the strainer 10 and the intake port 933*a* of the electric oil pump EOP is thereby reduced.

The upper side of the control valve CV extends up to above the electric oil pump EOP. As viewed from the direction of the vertical line VL (the direction of the axis of rotation Z1 of the electric oil pump EOP), the electric oil pump EOP is provided in a positional relationship overlapping the control valve CV.

The frame FR of the vehicle V is located (see FIG. 1) on the side of the side cover 7, and there is no room to expand the housing HS in the vehicle width direction (horizontal line HL direction).

In the present embodiment, when the electric oil pump EOP is disposed in the housing chamber S2, instead of simply aligning the electric oil pump parallel with the control valve CV, the electric oil pump EOP is arranged in the cut-out 923 provided in the control valve CV.

The control valve CV and the electric oil pump EOP can thereby be arranged within the housing section 68 without expanding the housing section 68 in the vehicle width direction or expanding the housing section 68 in the vehicle front-rear direction.

Consequently, when the control valve CV and the electric oil pump EOP are arranged in the housing chamber S2 (the housing section 68), which is different from the first chamber S1, within the case 6, the housing HS of the power transmission device 1 can be prevented from increasing in size in the front-rear direction and the width direction of the vehicle.

As shown in FIG. 7, the control valve CV has connection ports 65, 66 with the oil paths within the case (the first oil path 635 and the second oil path 636). The connection ports 65, 66 open toward a position closer to the torque converter cover 8 (to the left in the figure).

The oil cooler 20 is provided adjacent to the housing chamber S2.

Therefore, the oil cooler 20 is positioned so that the lengths of the oil paths connecting the control valve CV and the oil cooler 20 (the first oil path 635 and the first connection path 835, and the second oil path 636 and the second connection path 836) are shortest.

The oil pressure control circuit 95 inside the control valve CV regulates the operating oil pressure of the power transmission mechanism (such as the torque converter T/C, etc.) based on the oil pressure generated by the oil pump.

The power transmission device 1 is equipped with one each of the mechanical oil pump MOP and the electric oil pump EOP as oil pumps. These oil pumps suction, pressurize, and supply the oil OL collected in the bottom of the housing HS to the oil pressure control circuit 95 (see FIG. 8) inside the control valve CV.

Figure 8:
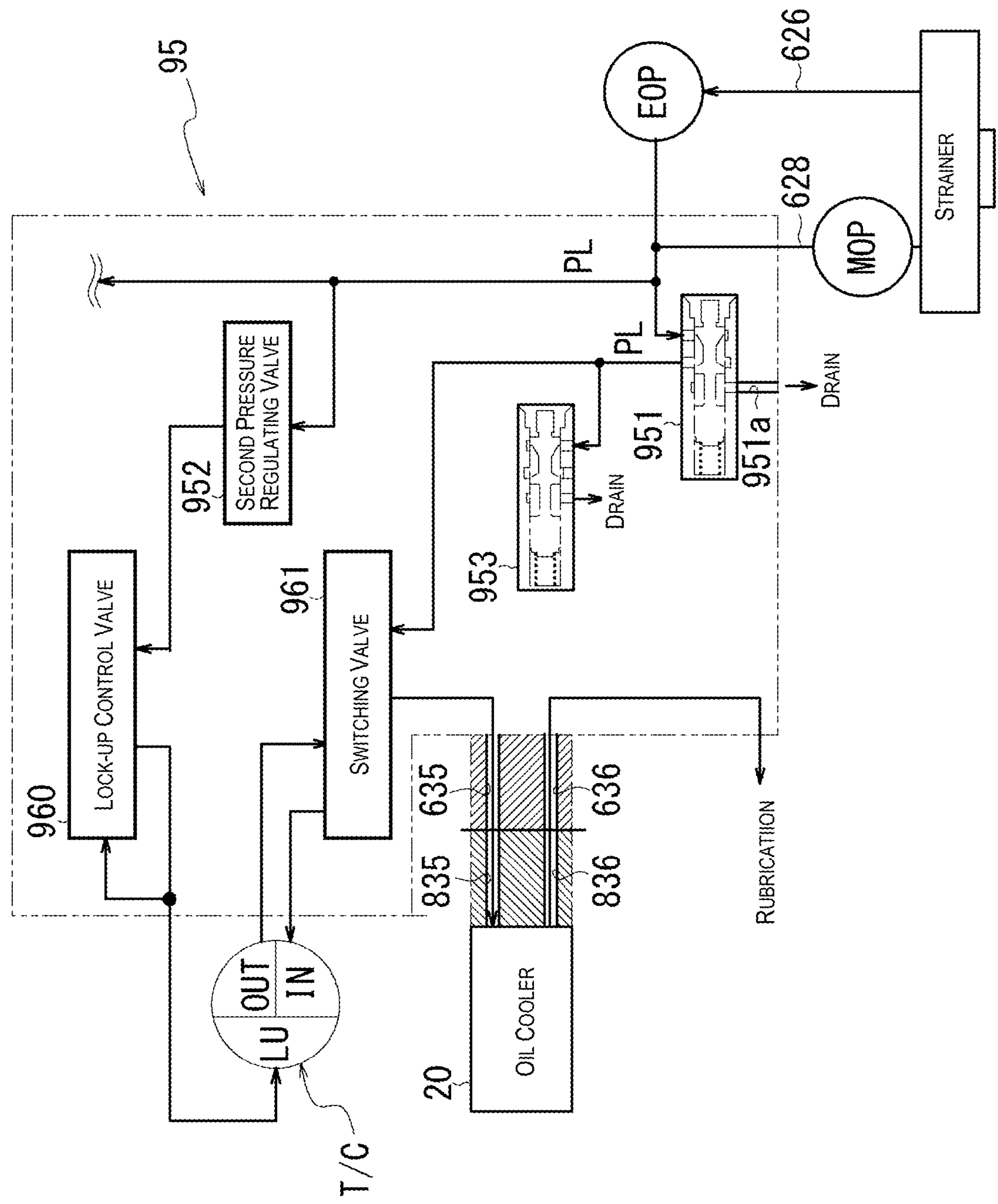
FIG. 8 is a diagram illustrating an example of an oil pressure control circuit inside the control valve.

FIG. 8 is a diagram illustrating an example of the oil pressure control circuit 95 inside the control valve CV, showing parts related to regulation of the oil pressure supplied to the torque converter T/C within the oil pressure control circuit 95.

A first pressure regulating valve 951 adjusts the line pressure PL based on the oil pressure generated by the oil pump OP by regulating the drainage amount of oil OL in the first pressure regulating valve 951.

The line pressure PL adjusted by the first pressure regulating valve 951 is regulated by the second pressure regulating valve 952 and then supplied to the lock-up control valve 960.

The lock-up control valve 960 adjusts the lock-up control pressure according to commands from a control device not shown and supplies this to the torque converter T/C. Switching between engagement and release of the lock-up clutch is thereby performed.

Further, the line pressure PL adjusted by the first pressure regulating valve 951 is regulated by adjusting the drainage amount from the third pressure regulating valve 953 and then supplied to the switching valve 961.

The switching valve 961 switches between supplying the oil OL provided from the third pressure regulating valve 953 to the inlet port of the torque converter T/C, and supplying the oil OL returned from the outlet port to the oil cooler 20.

The oil OL flowing toward the oil cooler 20 from the switching valve 961 passes through the first oil path 635 on the case 6 side and the first connection path 835 on the torque converter cover 8 side and is supplied to the oil cooler 20. The oil OL cooled by the oil cooler 20 is then returned to the control valve CV through the second connection path 836 and the second oil path 636.

The oil OL returned to the control valve CV is supplied to the parts of the power transmission device 1 that require lubrication, thereby lubricating the components of the power transmission device 1.

Thus, the oil cooler 20 is provided overlapping in the direction of the axis of rotation X1 of the power transmission device 1 with the control valve CV positioned outside the housing HS (case 6).

The control valve CV and the oil cooler 20 are disposed projecting in the same direction from the same side surface of the housing HS.

The control valve CV and the oil cooler 20 are thus closely positioned while projecting in the same direction on the same side surface of the housing HS in the power transmission device. Thus, an increase in size of the power transmission device 1 can be prevented.

Further, the lengths of the oil paths connecting the control valve CV and the oil cooler 20 (the first oil path 635 and the first connection path 835, and the second oil path 636 and the second connection path 836) can be reduced.

The oil path resistance acting on the oil OL flowing through the oil paths can thus be reduced.

Additionally, the oil OL output from the outlet port of the torque converter T/C is supplied through the switching valve 961 to the oil cooler 20.

During operation of the vehicle V in which the power transmission device 1 is mounted, the torque converter T/C generates heat. The oil OL output from the outlet port of the torque converter T/C is quickly supplied to the oil cooler 20 and cooled. If the length of the oil path from the torque converter T/C to the oil cooler 20 were long, the distance through which the hot oil OL flows in the housing HS would be shortened. This would result in the heating of the housing HS by the hot oil OL. This would increase the likelihood of the heating of the oil flowing through other oil paths in the housing HS.

Since the oil cooler 20 is arranged next to the control valve CV on the vehicle front side of the torque converter T/C, the length of the oil path from the torque converter T/C to the oil cooler 20 can be reduced. This reduces the possibility of the housing HS becoming heated by the hot oil OL and other oil paths through which the oil OL flows being warmed, as would be the case with longer oil paths.

As described above, the power transmission device 1 according to the present embodiment has the following configuration.

(1) The power transmission device 1 has a power transmission mechanism (the torque converter T/C, the forward-reverse switching mechanism 2, the variator 3, the reduction mechanism 4, and the differential device 5) that transmits driving force from the engine ENG (drive source) to the drive wheels WH, WH, a housing HS that accommodates the power transmission mechanism, a control valve CV that controls the pressure of the oil supplied to the power transmission mechanism, an oil cooler 20 (heat exchanger) that cools the oil, a first chamber S1 that houses the power transmission mechanism, and a housing chamber S2 (second chamber) where the control valve CV is arranged upright.

The housing HS has the case 6, the torque converter cover 8 (first cover) that is joined to the case 6 in the direction of the axis of rotation X of the power transmission mechanism, forming the first chamber S1 with the case 6, and a front cover 9 (second cover) that is joined to the case 6 in the front of the vehicle in the direction of the axis of rotation X of the power transmission mechanism, forming the housing chamber S2 (second chamber) with the case 6.

The oil cooler 20 (heat exchanger) is attached to the torque converter cover 8 on the side toward the front of the vehicle.

As viewed from the direction of the axis of rotation X of the power transmission mechanism, the oil cooler 20 is provided, at least in part and preferably entirely, so as to overlap the control valve CV.

With this configuration, the control valve CV is arranged in the housing chamber S2 which is separate from the first chamber S1. This creates extra room within the case 6 compared to providing the control valve CV in the first chamber S1 of the case 6. Consequently, the layout within the case 6 is improved.

Further, at least part and preferably all of the oil cooler 20 overlaps in the direction of the axis of rotation X of the power transmission mechanism with the control valve CV disposed outside the case 6 (on the vehicle front side of the housing HS). That is, as viewed from the direction of the axis of rotation X, the control valve CV and the oil cooler 20 are provided in a positional relationship at least partially overlapping on the vehicle front side of the housing HS.

As a result, on the same side of the housing HS, the control valve CV and the oil cooler 20 are arranged next to each other in the direction of the axis of rotation X1 of the power transmission device 1, projecting in the same direction. The oil cooler 20 can be provided next to the control valve CV using the protrusion height range of the control valve CV (front cover 9) that projects from the side of the housing HS.

If the control valve CV and the oil cooler 20 are provided on different sides of the housing HS, the power transmission device 1 would increase in size in different directions, leading to an overall increase in size. By providing the control valve CV and the oil cooler 20 on the same side of the housing HS and ensuring that at least a part, and preferably all, of the oil cooler 20 is in a positional relationship overlapping the control valve CV, as viewed from the direction of the axis of rotation X1 of the power transmission device 1, the directions of increase in size are aligned. This can limit the extent to which the power transmission device 1 increases in size depending on the degree of difference between the oil cooler 20 and the control valve CV.

Further, if, for example, the control valve CV is arranged on the vehicle front side of the housing HS and the oil cooler 20 is arranged on the vehicle rear side, there is the possibility of hindering the cooling efficiency of the oil OL.

As mentioned above, providing the control valve CV and the oil cooler 20 on the same side of the housing HS can be expected to improve the cooling efficiency of the oil OL.

(2) The torque converter cover 8 is a converter housing that accommodates the torque converter T/C.

As viewed from the direction of the axis of rotation X of the power transmission mechanism, the torque converter cover 8 has a circumferential wall section 81 that surrounds the outer circumference of the torque converter T/C.

The oil cooler 20 is attached at the bottom on the vehicle front side of the circumferential wall section 81 in the vertical line VL direction based on the installation state of the power transmission device 1 in the vehicle V.

As viewed from the direction of the axis of rotation X of the power transmission device 1, the region on the vehicle front side of the circumferential wall section 81 of the torque converter cover 8 (the side region facing the oil cooler 20) forms an arc that surrounds the outer circumference of the torque converter T/C.

Therefore, from the direction of the circumferential wall section 81 of the torque converter cover 8, there is a space (region a: see FIG. 6) on the outside of the circumferential wall section 81 at the bottom toward the front side of the vehicle that can be utilized for positioning the oil cooler 20.

By arranging the oil cooler 20 so that at least a part of the oil cooler 20 is located in the region a, the amount of projection of the oil cooler 20 from the housing HS can be reduced. This can reduce the extent to which the power transmission device 1 increases in size.

Additionally, when providing the oil path connecting the oil cooler 20 and the control valve CV within the torque converter cover 8, utilizing the aforementioned the region a can reduce an increase in size of the housing HS in the radial direction.

Simply arranging the control valve CV and the oil cooler 20 side by side would result in an increase in size of the housing HS.

For example, if the control valve CV and the oil cooler 20 are simply arranged in a line along the vehicle front-rear direction, the power transmission device 1 would grow toward the front of the vehicle. If the control valve CV and the oil cooler 20 were arranged simply in line along the direction of the axis of rotation X of the power transmission device 1, the power transmission device 1 would grow in the direction of the axis of rotation X.

By arranging the oil cooler 20 in the space (the region a: see FIG. 6) at the bottom of the torque converter cover 8 on the vehicle front side of the circumferential wall section 81, the power transmission device 1 can favorably be prevented from growing in the direction of the axis of rotation X of the power transmission device 1 and toward the front of the vehicle.

(i) The power transmission device 1 is configured by a first power transmission mechanism and a second power transmission mechanism.

The housing HS includes a torque converter cover 8 (converter housing) that accommodates the first power transmission mechanism (torque converter T/C), and a case 6 that accommodates the second power transmission mechanism (forward-reverse switching mechanism 2, variator 3, reduction mechanism 4, differential device 5).

The oil cooler 20 is mounted on the torque converter cover 8.

The control valve CV is mounted in the housing section 68 of the case 6.

In the direction of the axis of rotation X of the power transmission device 1, the case 6 and the torque converter cover 8 are adjacent to each other.

With this configuration, even if there is no room on the side of the case 6 to provide the oil cooler 20, the oil cooler 20 can be installed on the side of the torque converter cover 8.

This allows the oil cooler 20 to be provided adjacent to the control valve CV so as to overlap the control valve CV as viewed from the direction of the axis of rotation X. Therefore, the extent to which the power transmission device 1 increases in size in the radial direction of the axis of rotation X can be reduced.

(3) In the lower part of the circumferential wall section 81, on the side toward the front of the vehicle, bolt boss sections 871, 881, which are the mounting parts for the oil cooler 20, are provided.

As viewed from the direction of the axis of rotation X of the power transmission mechanism, the end surfaces 871*a*, 881*a*, which are the mounting surfaces (straight line Lz: see FIG. 4) of the bolt boss sections 871, 881 are positioned farther toward the rear of the vehicle relative to the joining surface (straight line L9: see FIG. 4) between the front cover 9 and the housing section 68.

With this configuration, the oil cooler 20 can be arranged without significantly projecting toward the front of the vehicle. This can reduce the extent to which the power transmission device 1 increases in size toward the front of the vehicle.

(4) As viewed from the direction of the axis of rotation of the power transmission device 1, the bolt boss sections 871, 881, which are the mounting parts for the oil cooler 20, are positioned below the axis of rotation X1 of the torque converter T/C.

As viewed from the direction of the axis of rotation of the power transmission device 1, in the torque converter cover 8, the oil cooler 20 is arranged in the region a (see FIG. 6) on the vehicle front side of the arcuate circumferential wall section 81 that follows the outer circumference of the torque converter T/C, lower than the axis of rotation X1 of the torque converter T/C.

At least a part of the oil cooler 20 is positioned in the region a.

With this configuration, the oil cooler 20 can be arranged without significantly projecting toward the front of the vehicle.

Further, the length of the piping connecting the oil cooler 20 with the first connection path 835 and the second connection path 836 can be minimized or even omitted. This allows for a reduction in the length of the oil paths (the first connection path 835 and the first oil path 635, the second connection path 836 and the second oil path 636) from the oil cooler 20 to the control valve CV.

This can reduce the resistance acting on the oil OL flowing through the oil paths, which can be expected to reduce the load on the oil pumps (electric oil pump EOP, mechanical oil pump MOP).

(ii) In the housing HS, the control valve CV and the oil cooler 20 are provided on the side surface toward the front of the vehicle (same side surface toward the front of the vehicle).

With this configuration, when the control valve CV and the oil cooler 20 are installed in the housing HS, there is no need to change the orientation of the housing HS. This allows for efficient installation of the control valve CV and the oil cooler 20 relative to the housing HS.

(5) The power transmission device 1 includes the electric oil pump EOP provided within the housing chamber S2.

As viewed from the direction of the axis of rotation X of the power transmission mechanism, the electric oil pump EOP is provided in a positional relationship overlapping the control valve CV and the oil cooler 20.

With this configuration, as viewed from the direction of the axis of rotation X, the electric oil pump EOP, the control valve CV, and the oil cooler 20 are provided on the front side of the housing HS and overlap.

This allows, for example, the oil cooler 20 to be accommodated within the range of the projection height range of the housing chamber S2 that houses the electric oil pump EOP and the control valve CV.

This can favorably reduce an increase in size of the power transmission device 1 in the radial direction (toward the front of the vehicle) of the axis of rotation X1.

(6) As viewed from the front of the vehicle, the housing section 68 that opens toward the front of the vehicle and surrounds the housing chamber S2 (second chamber) is attached to the case 6.

The housing chamber S2 is formed by sealing the opening of the housing section 68 with the front cover 9.

As viewed from the front of the vehicle, the oil cooler 20 is positioned outside the housing chamber S2, and as viewed from the direction of the axis of rotation X of the power transmission mechanism, the oil cooler 20 is disposed in a positional relationship overlapping the housing section 68 and the front cover 9.

With this configuration, the housing chamber S2, which contains the control valve CV, and the oil cooler 20 are provided aligned in the direction of the axis of rotation X of the power transmission mechanism on the vehicle front side of the housing HS.

Providing the control valve CV in the lower part of the housing HS contributes to the increase in size of the power transmission device 1 in the vertical line VL direction by an amount equal to the portion of the control valve CV.

By installing the control valve CV in the housing chamber S2 provided on the vehicle front side of the housing HS, the size of the power transmission device 1 in the vertical line VL direction can be reduced.

When the control valve CV is installed in the housing chamber S2 provided on the vehicle front side of the housing HS, it is necessary to arrange the pressure regulating valves within the oil pressure control circuit 95 in an orientation aligned with the horizontal line direction. Therefore, the control valve CV is arranged upright (see FIG. 7).

This allows for reducing the extent to which the power transmission device 1 increases in size toward the front of the vehicle when providing the control valve CV in the housing chamber S2.

By providing the oil cooler 20 in a position adjacent to the upright control valve CV, the extent to which the power transmission device 1 increases in size toward the front of the vehicle can be further reduced.

(7) As viewed from the front of the vehicle, within the housing chamber S2, the control valve CV and the electric oil pump EOP are aligned in the direction of the axis of rotation X of the power transmission mechanism. The control valve CV is positioned closer to the oil cooler 20 than the electric oil pump EOP.

With this configuration, when the electric oil pump EOP, the control valve CV, and the oil cooler 20 are disposed in a row along the direction of the axis of rotation X of the power transmission device 1, the housing section 68 can favorably prevent interference with the oil cooler 20.

Moreover, since the control valve CV and the oil cooler 20 are positioned close to each other in the direction of the axis of rotation X of the power transmission device 1, the length of the oil path connecting the control valve CV and the oil cooler 20 can be reduced.

(8) The power transmission device 1 includes a side cover 7 (third cover), which is joined to the case 6 from the direction of the axis of rotation X of the power transmission mechanism to form a third chamber S3 with the case 6.

The side cover 7 is joined to the case 6 from the opposite side of the torque converter cover 8 in the direction of the axis of rotation X of the power transmission mechanism.

The housing section 68 extends in a direction away from the oil cooler 20 along the axis of rotation X of the power transmission mechanism, reaching the side of the side cover 7.

With this configuration, as viewed from the radial direction of the axis of rotation X (toward the front of the vehicle), the housing section 68 is provided within the range of overlap of the case 6 and the side cover 7.

Therefore, the housing section 68 can be provided without projecting laterally beyond the side cover 7. This can favorably prevent the power transmission device 1 from increasing in size in the direction of the axis of rotation X.

(9) The case 6 is provided with the first oil path 635 connecting to the control valve CV and the second oil path 636 connecting to the control valve CV.

The torque converter cover 8 is provided with the first connection path 835 connecting to the oil cooler 20 and the second connection path 836 connecting to the oil cooler 20 (see FIG. 7).

The first connection path 835 and the first oil path 635 are arranged facing each other in the joining direction between the torque converter cover 8 and the case 6.

The second connection path 836 and the second oil path 636 are arranged facing each other in the joining direction between the torque converter cover 8 and the case 6.

With this configuration, the connection between the control valve CV and the oil cooler 20 is complete d once the joining between the torque converter cover 8 and the case 6 is completed. This facilitates the connection between the control valve CV and the oil cooler 20, thereby improving the efficiency of assembly of the power transmission device 1.

(10) In the torque converter cover 8, the boss section 865, which is the connection part on the side of the first connection path 835, is provided to a section facing the inlet 205 (oil inlet) for the oil OL in the oil cooler 20 (see FIG. 5). The boss section 866, which is the connection part on the side of the second connection path 836, is provided in a section facing the outlet 206 (oil outlet) of the oil OL of the oil cooler 20 (see FIG. 5).

The end surface 865*a* that is the connection part of the oil cooler 20 in the boss section 865 and the end surface 866*a* that is the connection part of the oil cooler 20 in the boss section 866 are flat surfaces in the same plane (straight line Lz: see FIG. 4) orthogonal to the assembly direction of the oil cooler 20 on the torque converter cover 8.

The oil cooler 20 is assembled onto the torque converter cover 8 from the front side of the vehicle. With this configuration, when the oil cooler 20 is attached to the torque converter cover 8, the end surface 865*a* of the boss 865 and the end surface 866*a* of the boss 866 are each joined to the inlet 205 and outlet 206 of the oil cooler 20, respectively, completing the connection between the oil cooler 20 and the first connection path 835 and the second connection path 836.

This facilitates the connection between the torque converter cover 8 and the oil cooler 20, thereby improving the efficiency of assembly of the power transmission device 1.

(11) In the torque converter cover 8, the first connection path 835 and the second connection path 836 are arranged vertically near the side of the region of the circumferential wall section 81 toward the front of the vehicle (the side facing the oil cooler 20) (see FIG. 4).

In the case 6, the first oil path 635 and the second oil path 636 are arranged vertically near the side of the circumferential wall section 61 toward the front of the vehicle (the side facing the control valve CV) (see FIG. 3).

With this configuration, the length of the oil paths connecting the control valve CV and the oil cooler 20 (the first oil path 635 and the first connection path 835, and the second oil path 636 and the second connection path 836) can be reduced. This can reduce the resistance acting on the oil OL flowing through the oil paths. This can be expected to reduce the load on the oil pumps (the electric oil pump EOP and the mechanical oil pump MOP).

In the foregoing embodiment, a case was illustrated in which the power transmission device 1 transmits the rotation of the engine ENG to the drive wheels WH, WH, but it is also possible for the power transmission device 1 to transmit the rotation of at least either the engine ENG or the motor (rotating electrical machine) to the drive wheels WH, WH. For example, it is possible to use a single-motor, double-clutch power transmission device (in which the motor is arranged between the engine ENG and the power transmission device, a first clutch is disposed between the engine ENG and the motor, and a second clutch is arranged inside the power transmission device 1).

Further, in the foregoing embodiment, a case was illustrated in which the power transmission device 1 has a shifting function, but it is also possible for the power transmission device simply to reduce speed (or increase speed) without a shifting function. If the power transmission device does not have a shifting function and instead reduces and transmits the rotation of the motor to the drive wheels WH, WH, the oil pressure control circuit for supplying the oil OL for cooling the motor and the oil OL for lubricating the reduction mechanism is arranged in the second chamber S2 with the electric oil pump EOP. Further, in the foregoing embodiment, a case was illustrated in which the control unit of the power transmission device 1 was provided with the control valve CV, but if the power transmission device 1 does not have a shifting mechanism and the drive source is a motor (rotating electrical machine) and not the engine ENG, then the control unit may be provided with an inverter or the like for controlling driving of the motor.

Embodiments of the present invention have been described above, but the present invention is not limited to those aspects shown in the embodiments. The present invention may be appropriately modified within the scope of the technical concept of the invention.

DESCRIPTION OF THE REFERENCE SYMBOLS

1 Power transmission device; 2 Forward-reverse switching mechanism (power transmission mechanism); 3 Variator (power transmission mechanism); 4 Reduction mechanism (power transmission mechanism); 5 Differential device (power transmission mechanism); 6 Case; 625 Connection section; 626 Oil path; 635 First oil path; 636 Second oil path; 68 Housing section; 7 Side cover (third cover); 8 Torque converter cover (first cover); 81 Circumferential wall section; 835 First connection path; 836 Second connection path; 865 Boss section (connection section); 865*a* End surface (mounting part); 866 Boss section (connection section); 866*a* End surface (mounting part); Lx Straight line along the mounting surface of the boss section; L9 Straight line along the joining surface between the front cover and the housing section; 9 Front cover (second cover); 20 Oil cooler (heat exchanger); 205 Inlet (oil inlet); 206 Outlet (oil outlet); CV Control valve; ENG Engine (drive source); EOP Electric oil pump; HS Housing; S1 First chamber; S2 Housing chamber (second chamber); S3 Third chamber; T/C Torque converter (power transmission mechanism); WH Drive wheels; X1 Axis of rotation (axis of the torque converter); and X2-X4, X Axes of rotation.

The invention claimed is:

1. A power transmission device for a vehicle, comprising:
a housing that accommodates a power transmission mechanism;
a control valve configured to control a pressure of oil supplied to the power transmission mechanism;
a heat exchanger configured to cool the oil;
a first chamber that accommodates the power transmission mechanism;
a second chamber in which the control valve is arranged upright; and
an electric oil pump arranged in the second chamber,
wherein the housing includes
a case,
a first cover joined to the case in a direction of an axis of rotation of the power transmission mechanism, forming the first chamber with the case, and
a second cover joined to the case from a front of the vehicle as viewed from the direction of the axis of rotation of the power transmission mechanism, forming the second chamber with the case,
the heat exchanger is attached to a vehicle front side of the first cover,
as viewed from the direction of the axis of rotation of the power transmission mechanism, at least a part of the heat exchanger is provided in a positional relationship overlapping the control valve, and
as viewed from the direction of the axis of rotation of the power transmission device, the electric oil pump is provided in a positional relationship overlapping the control valve and the heat exchanger.

2. The power transmission device according to claim 1, further comprising
a housing section, which has an opening facing the front of the vehicle and surrounding a region of the second chamber, attached to the case as viewed from the front of the vehicle, wherein
the second chamber is defined by the housing section with the second cover with the opening of the housing section being sealed with the second cover,
as viewed from the front of the vehicle, the heat exchanger is positioned outside the housing section, and
as viewed from the direction of the axis of rotation of the power transmission mechanism, the heat exchanger is provided in a positional relationship overlapping the housing section and the second cover.

3. The power transmission mechanism according to claim 2, wherein
as viewed from the front of the vehicle, the oil pump and the control valve are aligned along the direction of the axis of rotation of the power transmission mechanism inside the second chamber, and
the control valve is arranged closer to the heat exchanger than the oil pump.

4. The power transmission device according to claim 2, further comprising
a third cover joined to the case from the direction of the axis of rotation of the power transmission mechanism, forming a third chamber with the case, wherein
the third cover is joined to the case from an opposite side of the first cover in the direction of the axis of rotation of the power transmission mechanism, and
the housing section extends away from the heat exchanger along the axis of rotation of the power transmission mechanism reaching a region adjacent to a side of the third cover.

5. The power transmission device according to claim 1, wherein
the case includes
a first oil path connecting to the control valve, and
a second oil path connecting to the control valve,
the first cover includes
a first connection path connecting to the heat exchanger, and
a second connection path connecting to the heat exchanger,
the first connection path and the first oil path face each other in a direction in which the case and the first cover are joined, and
the second connection path and the second oil path face each other in a direction in which the case and the first cover are joined.

6. The power transmission device according to claim 5, wherein
the first cover includes
a connection part on a first connection path side provided in a section opposing an oil inlet of the heat exchanger, and
a connection part on a second connection path side provided in a section opposing an oil outlet of the heat exchanger.

7. The power transmission device according to claim 5, wherein
in the first cover, the first connection path and the second connection path are arranged vertically adjacent to a side surface of the first cover facing the heat exchanger, and
in the case, the first oil path and the second oil path are arranged vertically adjacent to a side surface of the case facing the control valve.

8. A power transmission device for a vehicle, comprising:
a housing that accommodates a power transmission mechanism;
a control valve configured to control a pressure of oil supplied to the power transmission mechanism;
a heat exchanger configured to cool the oil;
a first chamber that accommodates the power transmission mechanism; and
a second chamber in which the control valve is arranged upright,
wherein the housing includes
a case,
a first cover joined to the case in a direction of an axis of rotation of the power transmission mechanism, forming the first chamber with the case, and
a second cover joined to the case from a front of the vehicle as viewed from the direction of the axis of rotation of the power transmission mechanism, forming the second chamber with the case,
the heat exchanger is attached to a vehicle front side of the first cover,
as viewed from the direction of the axis of rotation of the power transmission mechanism, at least a part of the heat exchanger is provided in a positional relationship overlapping the control valve, the first cover is a converter housing that accommodates a torque converter, as viewed from the direction of the axis of rotation of the power transmission mechanism, the converter housing includes a circumferential wall section surrounding an outer circumference of the torque converter, the heat exchanger is attached to a bottom of the circumferential wall section toward the front of the vehicle along a vertical line based on an installation state of the power transmission mechanism in the vehicle, in the bottom of the circumferential wall section, a mounting part of the heat exchanger is arranged on a side facing the front of the vehicle, as viewed from the direction of the axis of rotation of the power transmission mechanism, a mounting surface of the mounting part is located farther toward a rear of the vehicle than a surface joining the second cover and the case, and the mounting part is located below an axis of rotation of the torque converter.

9. The power transmission device according to claim 8, further comprising an electric oil pump provided inside the second chamber, wherein as viewed from the direction of the axis of rotation of the power transmission mechanism, the electric oil pump is provided in a positional relationship overlapping the control valve and the heat exchanger.

10. The power transmission device according to claim 9, further comprising a housing section, which has an opening facing the front of the vehicle and surrounding a region of the second chamber, attached to the case as viewed from the front of the vehicle, wherein the second chamber is defined by the housing section with the second cover with the opening of the housing section being sealed with the second cover, as viewed from the front of the vehicle, the heat exchanger is positioned outside the housing section, and as viewed from the direction of the axis of rotation of the power transmission mechanism, the heat exchanger is provided in a positional relationship overlapping the housing section and the second cover.

11. The power transmission mechanism according to claim 10, wherein as viewed from the front of the vehicle, the oil pump and the control valve are aligned along the direction of the axis of rotation of the power transmission mechanism inside the second chamber, and the control valve is arranged closer to the heat exchanger than the oil pump.

12. The power transmission device according to claim 10, further comprising a third cover joined to the case from the direction of the axis of rotation of the power transmission mechanism, forming a third chamber with the case, wherein the third cover is joined to the case from an opposite side of the first cover in the direction of the axis of rotation of the power transmission mechanism, and the housing section extends away from the heat exchanger along the axis of rotation of the power transmission mechanism reaching a region adjacent to a side of the third cover.

13. The power transmission device according to claim 8, wherein the case includes a first oil path connecting to the control valve, and a second oil path connecting to the control valve, the first cover includes a first connection path connecting to the heat exchanger, and a second connection path connecting to the heat exchanger, the first connection path and the first oil path face each other in a direction in which the case and the first cover are joined, and the second connection path and the second oil path face each other in a direction in which the case and the first cover are joined.

14. The power transmission device according to claim 13, wherein the first cover includes a connection part on a first connection path side provided in a section opposing an oil inlet of the heat exchanger, and a connection part on a second connection path side provided in a section opposing an oil outlet of the heat exchanger.

15. The power transmission device according to claim 13, wherein in the first cover, the first connection path and the second connection path are arranged vertically adjacent to a side surface of the first cover facing the heat exchanger, and in the case, the first oil path and the second oil path are arranged vertically adjacent to a side surface of the case facing the control valve.

* * * * *